(12) United States Patent
Gillaspie et al.

(10) Patent No.: US 8,643,930 B2
(45) Date of Patent: Feb. 4, 2014

(54) THIN FILM LITHIUM-BASED BATTERIES AND ELECTROCHROMIC DEVICES FABRICATED WITH NANOCOMPOSITE ELECTRODE MATERIALS

(75) Inventors: Dane T. Gillaspie, Golden, CO (US); Se-Hee Lee, Louiseville, CO (US); C. Edwin Tracy, Golden, CO (US); John Roland Pitts, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 592 days.

(21) Appl. No.: 12/675,118

(22) PCT Filed: Aug. 31, 2007

(86) PCT No.: PCT/US2007/077419
§ 371 (c)(1),
(2), (4) Date: Feb. 24, 2010

(87) PCT Pub. No.: WO2009/029111
PCT Pub. Date: Mar. 5, 2009

(65) Prior Publication Data
US 2011/0151283 A1  Jun. 23, 2011

(51) Int. Cl.
*C01G 49/02* (2006.01)
(52) U.S. Cl.
USPC .......................... 359/265; 359/273
(58) Field of Classification Search
USPC ................................. 359/265, 273
See application file for complete search history.

(56) References Cited

U.S. PATENT DOCUMENTS

| | | | |
|---|---|---|---|
| 4,474,686 A | 10/1984 | Miyauchi et al. | |
| 5,783,333 A | 7/1998 | Mayer | |
| 6,083,475 A | 7/2000 | Shackle et al. | |
| 6,420,071 B1 | 7/2002 | Lee et al. | |
| 6,620,342 B1 * | 9/2003 | Burchill et al. | 252/511 |
| 6,749,648 B1 | 6/2004 | Kumar et al. | |
| 6,805,999 B2 | 10/2004 | Lee et al. | |
| 6,855,749 B1 | 2/2005 | Yadav et al. | |
| 6,859,297 B2 | 2/2005 | Lee et al. | |
| 6,916,872 B2 | 7/2005 | Yadav et al. | |
| 7,042,615 B2 | 5/2006 | Richardson | |
| 7,265,891 B1 | 9/2007 | Demiryont | |
| 2002/0076616 A1 * | 6/2002 | Lee et al. | 429/300 |
| 2004/0048157 A1 | 3/2004 | Neudecker et al. | |
| 2009/0057137 A1 | 3/2009 | Pitts et al. | |

FOREIGN PATENT DOCUMENTS

| | | |
|---|---|---|
| CN | 1487104 | 4/2004 |
| JP | 08-279357 | 10/1996 |
| JP | 12-277108 | 10/2000 |
| JP | 15-173775 | 6/2003 |
| JP | 17-320184 | 11/2005 |

OTHER PUBLICATIONS

Xu et al. A novel wet chemical route to NiO nanowires Apr. 2003.*

(Continued)

*Primary Examiner* — Ula C Ruddock
*Assistant Examiner* — Frank Chernow
(74) *Attorney, Agent, or Firm* — Paul J. White

(57) ABSTRACT

Thin-film lithium-based batteries and electrochromic devices (10) are fabricated with positive electrodes (12) comprising a nanocomposite material composed of lithiated metal oxide nanoparticles (40) dispersed in a matrix composed of lithium tungsten oxide.

8 Claims, 7 Drawing Sheets

(56) References Cited

OTHER PUBLICATIONS

Berggren at al., "Optical absorption in lithiated tungsten oxide thin films: Experiment and theory", Department of Engineering Sciences, The Angstrom Laboratory, Uppsala University, Uppsala, Sweden, Aug. 2007; (published online 25 Oct. 2007).

Lee et at., "Lithium Insertion in Tungsten Oxide Thin Films", The International Society for Optical Engineering, Aug. 2001, pp. 194-202, NREL Report No. 31881, SPIE vol. 4458, Bellingham, WA.

Pistoia et al., "Lithiated MnO2 Phases as Cathodes for 3 V Li and Li-Ion Cells", May 1997, J. Electrochem. Soc., vol. 144, Issue 5, pp. 1553-1659.

International Preliminary Report on Patentability for International (PCT) Application No. PCT/US20071077419, Issued Mar. 2, 2010.

Lee, et al., "Nanocomposite Counter-Electrode Materials for Electrochromic Windows", ECS 210th Meeting, 2006, Abstract #1772, 1 page.

Lee, et al., "Solid-State Nanocomposite Electrochromic Pseudocapacitors", Electrochemical SOlid-State Letters, 2005, vol. 8, No. 4, pp. A188-A190.

Tarascon, et al., "Issues and challenges facing rechargeable lithium batteries", Nature, Nov. 15, 2001, vol. 415, pp. 359-367.

Lee, et al., "Characterization of Ni-W oxide thin film electrodes", Solid State Ionics, 1998, vol. 109, pp. 303-310.

International Search Report and Written Opinion for International (PCT) Application No. PCT/US2007/077419, mailed Apr. 28, 2008.

Berggren et al. "Optical charge transfer absorption in lithium-intercalated tungsten oxide thin films", Applied Physics Letters 88, 081906, Feb. 21, 2006.

\* cited by examiner

THIN FILM LITHIUM-BASED BATTERIES AND ELECTROCHROMIC DEVICES FABRICATED WITH NANOCOMPOSITE ELECTRODE MATERIALS

CONTRACTUAL ORIGIN

The United States Government has rights in this invention under Contract No. DE-AC36-99GO10337 between the United States Department of Energy and the National Renewable Energy Laboratory, a Division of the Midwest Research Institute.

BACKGROUND

1. Technical Field

This technology is related to thin-film lithium-based batteries and electrochromic devices and to methods and materials for fabricating same.

2. Prior Art

Thin-film lithium-based batteries usually have several electrochemical cells that are connected in series and/or parallel to provide a desired voltage and capacity. Each cell has a positive electrode (cathode) and a negative electrode (anode) separated by an electrolyte solution containing dissociated lithium salts, which enable lithium ion ($Li^+$) transfer between the two electrodes. Both of the electrodes are sources of chemical reactions, and once the electrodes are connected externally, the chemical reactions proceed in tandem at both electrodes, which causes electrons to flow through the external connection from the negative electrode (anode) to the positive electrode (cathode). If an electrical load is placed in the external connection (circuit) between the anode and the cathode, the flow of electrons can produce useful work.

Myriad materials are being, or have been, used for the positive electrodes, negative electrodes, and electrolytes in lithium ion battery cells, as explained, for example, in the article J. M. Tarascon & M. Armand, "Issues and challenges facing rechargeable lithium batteries," *Nature*, Vol. 415, pages 359-367, 15 Nov. 2001. Several of such materials used for positive electrodes include, for example, vanadium oxides, lithium-metal-oxides, such as $LiNiO_2$, $LiCoO_2$, $LiNi_{1-x}CO_xO_2$, and various di-, tri-, or tetravalent substitutes for Ni or Co (e.g., Al, Ga, Mg, or Ti), $LiMnO_2$, $LiFeO_2$, and others. Several of the materials used for negative electrodes include lithium metal (Li), carbons (e.g., graphite), lithium transition-metal nitrides, and others. A number of aqueous and non-aqueous electrolytes, including gels and solids, have been used, some of the more common of which include perfluorosulphonimide $Li^+[CF_3SO_2NSO_2CF_3]^-$ salt (LiTFSI) and glassy lithium phosphorus oxynitride (LiPON), such as $Li_3PO_{4-x}N_x$, where x can be any number between 0 and 4 that makes a stoichiometric material.

Lithium ion cells can also be made with positive and/or negative electrodes that have electrochromic characteristics, i.e., change in transmissivity depending on applied electric field. Consequently, lithium ion cells have also been adapted to electrochromic devices, for example, windows and other glazing, lighting and displays, optical communications systems, architectural materials, analytical instruments, and consumer goods. Electrochromic lithium ion cells have similarities to lithium ion battery cells, including, for example, a lithium salt electrolyte between chemically reactive electrodes. However, battery cells do not have to be transparent, whereas electrochromic windows and other devices have to be at least somewhat transmissive to light at least in the bleached phase. State-of-the-art electrochromic devices utilize two electrochromic materials, one of which—the negative electrode (also called "cathode," "working electrode," or "active electrode")—changes from a colorless (bleached) state to a colored (darkened) state upon reduction (gain of electrons) while the other of which—the positive electrode (also called the "anode" or "counter electrode")—also changes from a colorless (bleached) state to a colored (darkened) state upon oxidation (loss of electrons). The reduction of the working electrochromic material at the negative electrode and the oxidation of the counter electrochromic material at the positive electrode are forced by an external power source, which operates as an electron pump to transfer electrons from one electrode to the other. Reversal of the voltage polarity reverses the coloration to re-bleach both the negative electrode material and the positive electrode material. The current is transferred internally by the lithium ions ($Li^+$) in the electrolyte. Examples of electrochromic materials useful for the negative cathode include tungsten and niobium oxides, but for electrochromic windows, tungsten oxide ($WO_3$) has become the material of choice because of its superior electrochromic properties and relative ease of deposition by sputtering and a variety of other methods. Examples of electrochromic materials suitable for the positive electrode include oxides of nickel, manganese, cobalt, molybdenum, iron, and vanadium as well as $LiNiO_2$, $LiMnO$, and $LiFeO_2$. LiPON is one of a number of lithium ion electrolytes that can be used in lithium ion electrochromic devices.

In spite of all of the developments and improvements in lithium ion batteries and electrochromic devices, improvements in cycle life, lifetime, cell potential, and capacity (charge density) for batteries and in response time, photopic transmittance ratio, and service lifetime for electrochromic devices are still desired.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

An example electrochemical cell is disclosed that includes a negative electrode and comprises a cathodic electrochromic material that darkens upon electrochemical reduction; a positive electrode comprising an anodic Li-M-W oxide material, e.g., a nanocomposite of lithiated M oxide (LMO) crystallite nanoparticles wherein such nanoparticles include $Li_xNi_{1-x}O$ and where $0 \leq x \leq 0.5$ dispersed in a matrix of lithium tungsten oxide (Li—W—O) [i.e., a mixture comprising a plurality of different lithium tungsten oxide stoichiometries] that darkens upon electrochemical oxidation, in which M includes at least one of Ni, Mn, Co, Fe, and V; and a lithium ion electrolyte sandwiched between the negative electrode and the positive electrode. The exemplary electrochemical cell may include an external circuit with an electric power source connected between negative and positive electrodes to drive electrons into the cathodic material and cause reduction of the cathodic material.

An exemplary battery cell is disclosed comprising a negative electrode comprising a material that oxidizes to a lower energy state; a positive electrode comprising a Li-M-W oxide material (a nanocomposite of $Li_xM_yO$ crystallite nanoparticles, which may include $Li_xNi_{1-x}O$, where $0 \leq x \leq 0.5$, dispersed in a matrix of lithium tungsten oxide including is a mixture comprising a plurality of different lithium tungsten oxide stoichiometries where $0 \leq x \leq 0.5$ and $0.1 \leq y \leq 1$), wherein M includes at least one of Ni, Mn, Co, Fe and V; and a lithium ion electrolyte sandwiched between the negative electrode and the positive electode.

An example anodic electrochromic material is disclosed that darkens upon electrochemical oxidation, comprising Li-M-W oxide material, e.g., a nanocomposite of lithiated M oxide crystallite nanoparticies (including $Li_xNi_{1-x}O$, where $0 \leq x \leq 0.5$ and where the M includes one or more of Ni, Mn, Co, Fe, and V) dispersed in a matrix of lithium tungsten oxide.

An example electrochromic material is disclosed which comprises polycrystalline $Li_xNi_{1-x}O$ nanoparticles (where $0 \leq x \leq 0.5$) surrounded by a solid-state lithium superionic conductor which comprises lithium tungsten oxide that includes at least the following stoichiometric lithium tungsten oxide compounds: $Li_2WO_4$ and $Li_2W_4O_{13}$.

An example method of synthesizing an electrochromic nanocomposite material is disclosed that includes polycrystalline lithiated nickel oxide nanoparticles surrounded by a solid-state lithium tungsten oxide superionic conductor, which includes preparing a target material comprising a ratio of Li:Ni:W=1.2:1.0:0.1; and depositing the target material on a substrate.

An example method of synthesizing an electrochromic nanocomposite material is disclosed that includes polycrystalline lithiated nickel oxide nanoparticles surrounded by a solid-state lithium tungsten oxide superionic conductor, comprising pressing a mixture of powdered $Li_2CO_3$, NiO, and $WO_3$ into pellets of the mixture; heating the pellets of the mixture to volatize and remove the carbon from the $Li_2CO_3$ and from the mixture; grinding the pellets without the carbon back into powder to provide a powder mixture of $Li_2O$, NiO, and $WO_3$; re-pressing the mixture of $Li_2O$, NiO, and $WO_3$ into pellets and reheating the pellets to form a target material; and growing a film of lithium nickel tungsten oxide nanocomposite material by depositing the target material on a substrate.

In addition to the exemplary aspects and embodiments described above, further aspects and embodiments will become apparent by reference to the drawings and by study of the following descriptions.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting.

DETAILED DESCRIPTION

Figure 1:
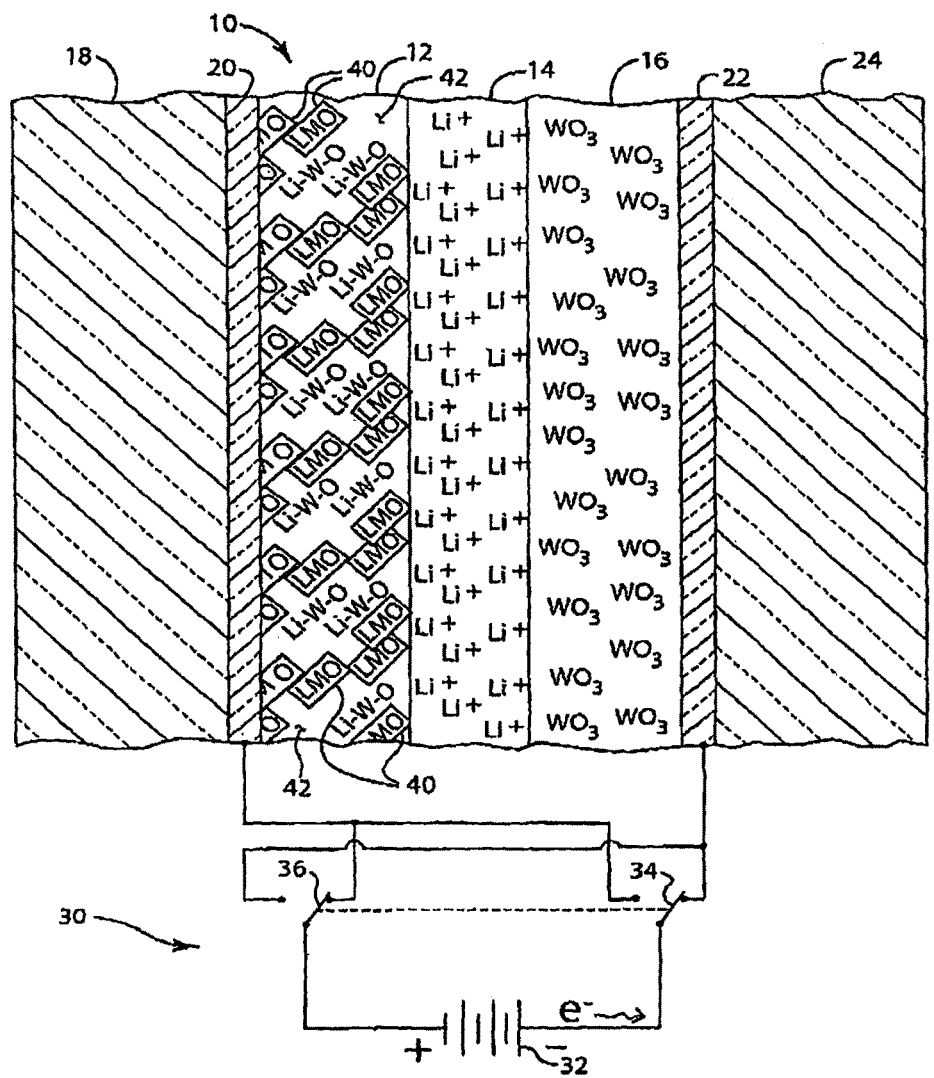
FIG. 1 is a diagrammatic section view of an electrochromic device that includes a positive or counter electrode comprising lithium nickel tungsten oxide nanocomposite material.

An example section of lithium ion electrochromic cell 10 is shown diagrammatically in FIG. 1 to illustrate an example implementation of a lithium ion electrochromic cell with a positive electrode 12 comprising lithium nickel tungsten oxide nanocomposite material, wherein a lithium ion electrolyte 14 is positioned between a positive electrode 12 on a substrate 18 and a negative electrode 16 on a substrate 24. Contact layers 20, 22, for example, a transparent conducting oxide (TCO), can be provided for electrical connection of the electrochromic cell 10 to an external circuit having a power source 32, such as the external circuit 30 illustrated schematically in FIG. 1 as an example.

In the example electrochromic device 10, the negative electrode 16 (also sometimes called the active electrode or cathode) is shown as being comprised of a normally reduced tungsten oxide ($WO_3$) material, although it could be any of a number of normally reduced materials typically used for negative electrodes in chemochromic devices. The positive electrode 12 (also sometimes called the counter electrode or anode) is a nanocomposite material comprising polycrystalline, at least partially lithiated, metal oxide (LMO) nanoparticles 40 surrounded by a lithium-based, solid-state superionic conductor 42 comprised of lithium-tungsten-oxide (Li—W—O). The LMO and Li—W—O designations are general notations for the illustration in FIG. 1. These materials that comprise the nanocomposite material of the positive electrode 12 will be described in more detail below. Nanoparticle here means less than a micrometer. This nanocomposite material for the positive electrode 12 can be deposited, for example, by sputtering from a sintered ceramic target comprising lithium oxide ($Li_2O$), the metal oxide (MO), and tungsten oxide ($WO_3$), where M can be Ni, Mg, Co, or Fe, to produce nanoparticles of the lithiated metal oxide, for example lithiated nickel oxide ($Li_xNi_{1-x}O$, which are characterized by crystallite sizes in the nanometer range, i.e., less than a micrometer, and preferably, but not necessarily, about 5 to 35 nm. The $Li_xNi_{1-x}O$ crystallites in this nanocomposite material, i.e., in the lithium nickel tungsten oxide (sometimes abbreviated as "LNWO") are much smaller than the crystallites in previously used positive electrode materials such as $LiNiO_2$.

The lithium tungsten oxide is amorphous and can be composed of at least one of lithium oxide and lithium tungsten oxides, for example, $Li_2O$, $Li_2WO_4$, and $Li_2W_4O_{13}$, and is usually a mixture comprising more than one of these materials. The $LiO_2$, $Li_2WO_4$, and $Li_2W_4O_{13}$ of those examples are stoichiometric comounds, as is understood by persons skilled in the art. The partially lithiated metal oxide (LMO), for example, $Li_xNi_{1-x}O$ (where $0 \leq x \leq 0.5$), is a crystalline structured nanoparticle, because the tungsten oxide prevents the nickel oxide or other metal oxide used from forming large, crystalline structures, The lithiated metal oxide, e.g., the partially lithiated nickel oxide, nanoparticles 40 have large surface area/volume ratios, e.g., in a range of 0.12 $nm^{-1}$ to 1 $nm^{-1}$, and they are in intimate contact with the surrounding solid-state lithium ion superionic conductor 42, which basically fills the pores between the lithiated metal oxide nanoparticles 40, thereby maximizing the usage and accessibility of the total surface of the metal oxide nanoparticles. The terms partially lithiated and lithiated are used interchangeably when referring to the partially lithiated and lithiated metal oxides, because the extent of the lithiation of the metal oxides in the nanocomposite material (LMO) can vary and may even include some amount of metal oxide crystallites or nanoparticles that are not lithiated, as indicated above in the example $Li_xNi_{1-x}O$ (where $0 \le x \le 0.5$).

The electrolyte layer 14 can be LiPON or any other suitable electrolyte that provides a supply of lithium ions ($Li^+$) for transport back and forth between the negative electrode 16 and the positive electrode 12.

As mentioned above, the negative electrode 16 is a normally oxidized material, for example, tungsten oxide ($WO_3$), which is bleached or clear in its normal oxidized state, but which darkens or colors to a dark blue upon insertion of lithium ions ($Li^+$) from the electrolyte and reduction to a higher energy state in the form of $Li_nWO_3$ upon application of a voltage to a circuit 30 that causes a flow of electrons into the negative electrode 16 according to the general formula:

$$WO_3 + ne^- + nLi^+ \rightarrow Li_nWO_3 \qquad (1)$$

where n can be any number.

This reaction is reversible to transform the dark colored $Li_nWO_3$ back to transparent $WO_3$, which can occur automatically when an external circuit accommodates flow of electrons from the negative electrode back to the positive electrode or which can be accelerated by reversing the voltage polarity of the external circuit 30, for example, by switching the switches 34, 36 shown schematically in FIG. 1. The reverse reaction from dark to clear is:

$$Li_nWO_3 \rightarrow WO_3 + nLi^+ + ne^- \qquad (2)$$

where n can be any number.

The lithium nickel tungsten oxide nanocomposite material has been prepared, for example, by RF magnetron sputtering from a sintered ceramic target comprising lithium oxide, nickel oxide, and tungsten oxide, as will be described in more detail below. The tungsten oxide is believed to prevent the nickel oxide from forming large crystalline structures, as reported by Se-Hee Lee et al. in their article "Characterization of Ni—W oxide thin film electrodes," *Solid State Ionics*, Volume 109, pages 303-310 (1998). However, there is little, if any, nickel-tungsten oxide (NiWO) in the lithium nickel tungsten oxide nanocomposite material, and the lithium ion superionic conductor 42 comprising lithium-tungsten oxide is a superior conductor of lithium ions ($Li^+$) from the electrolyte 14 to the nickel oxide crystallites 40. Nickel oxide (NiO) is a dense structure, thus typically slow to oxidize in larger crystalline form, so the nanocrystalline, nearly amorphous, partially lithium-substituted nickel oxide 40 described herein is more accessible to lithium ions, as suggested by the Se-Hee Lee et al. article cited above, but the oxidation reaction of $Ni^{2+}$ (clear or bleached) to $Ni^{3+}$ (darkened) in the positive electrode 12 is enhanced even further by the lithium-tungsten oxide superionic conductor matrix 42 in the lithium nickel tungsten oxide nanocomposite material (LNWO), which in a functional sense, becomes an extension of the electrolyte 14.

Since the electrochromic transition from clear or bleached state to a darkened state in the positive electrode 12 is provided primarily by the oxidation of the nickel oxide in the positive electrode 12, albeit enhanced by the nanocrystallite structure of the lithiated nickel oxide and by the lithium ion conductor matrix 42 of lithium-tungsten oxide as described above, the oxidation reaction is typical for nickel oxide counter electrodes in lithium ion electrochromic devices, i.e., $$Li_nNiO \rightarrow NiO + nLi^+ + ne^- \qquad (3)$$

where n can be any number.

To revert back from dark to clear, the reduction reaction is:

$$NiO + ne^- + nLi^+ \rightarrow Li_nNiO \qquad (4)$$

where n can be any number.

In the reverse (reduction) reaction, the $Li^+$ and the compensating $e^-$ change any $Ni^{3+}$ (dark) in the film into $N^{2+}$ (clear). Note that the crystallites in our film start in some intermediate colored state, since they are partially lithiated.

As mentioned briefly above, the lithium nickel tungsten oxide nanocomposite material (LNWO) for the positive electrode 12 can be provided by RF sputtering of a sintered ceramic target of lithium oxide, nickel oxide, and tungsten oxide onto a substrate (or onto a contact conductor layer 20 on a substrate 18), but other deposition techniques, such as pulsed laser deposition, DC sputtering of ceramic targets, and DC/RF reactive sputtering of metallic alloy targets, can also be used. For example, target materials comprising lithium oxide, nickel oxide, and tungsten oxide have been prepared by pressing a mixture of powdered $Li_2CO_3$, NiO, and $WO_3$ in a hydraulic press to produce pellets of the mixture. The resulting pellets were then heated in an oven to at least 700° C. to volatize and remove the carbon from the lithium carbonate. Subsequently, the pellets without the carbon were ground back to powder form, repressed, and then reheated to form a durable target material for use in growing thin films of the lithium nickel tungsten oxide nanocomposite material (sometimes abbreviated as "LNWO") by pulsed laser deposition or sputtering. Higher sintering temperatures can be chosen in order to yield a stronger, more durable target. However, due to the relative volatility of the lithium, the resulting targets could be lithium reduced compared to the films described below. The thin films that have been grown using RF magnetron sputtering of such lithium nickel tungsten oxide nanocomposite material with a stoichiometric ratio of Li:Ni:W=1.2:1.0:0.1 in the target have shown strong anodic electrochromic activity as well as high charge capacity for battery applications, as will be described in more detail below. However, the optimal ratio of Li:Ni:W can be deviated from that ratio. In general, the $Li_xNi_{1-x}O$ nanoparticles can comprise in the range of 25 to 99 percent of the LNWO while the lithium tungsten oxide matrix comprises one to 75 percent of the LNWO.

For several examples described below, a target was made from a mixture 14.0271 grams of $Li_2CO_3$, 23.6328 grams of NiO, and 7.3353 grams of $WO_3$ for a starting stoichiometry ratio of $(Li_2CO_3)_{0.6}(NiO)_{1.0}(WO_3)_{0.1}$. This mixture was pressed and sintered at 700° C. for eight hours. After the carbon was volatized and removed, the remaining material was ground down and re-pressed into pellets and reheated at 700° C. for eight hours two times to form a sputtering target with a nominal ratio of Li:Ni:W=1.2:1.0:0.1.

EXAMPLE I

A LNWO layer about 110 nm thick was grown from the target material described above onto fluorine-doped tin oxide (FTO) by RF sputtering in an atmosphere of pure argon.

EXAMPLE II

A LNWO layer about 80 nm thick was grown from the target material described above onto FTO by RF sputtering in an atmosphere of one-third oxygen and two-thirds argon.

EXAMPLE III

A LNWO layer about 100 nm thick was grown from the target material described above onto FTO by RF sputtering in an atmosphere of two-thirds oxygen and one-third argon.

EXAMPLE IV

A LNWO layer about 110 nm thick was grown from the target material described above onto FTO by RF sputtering in an atmosphere of pure oxygen.

EXAMPLE V

A LNWO layer about 115 nm thick was grown from the target material described above onto FTO by RF sputtering in an atmosphere of one-half oxygen and one-half argon.

The LNWO materials from the Examples I-IV bleached quickly from an initial dark color to a very clear bleached state, but they could not be re-colored. Their poor performance is probably attributable to incomplete burn-in of the target. However, the LNWO material from Example V performed very well. From an initial dark color, it bleached and darkened well with excellent repeatability. It also had a total charge per cycle of 15 μAh/cm$^2$.

On LNWO films with varying compositions, thicknesses, and growth parameters, inductively-coupled plasma mass spectrometry has shown the nickel-tungsten ratio of the films to be roughly equal to that of the targets from which they were grown. Also, X-ray diffraction and transmission election microscopy experiments have shown the films to be nanocrystalline, as will be related in the following examples.

EXAMPLE VI

Figure 2:
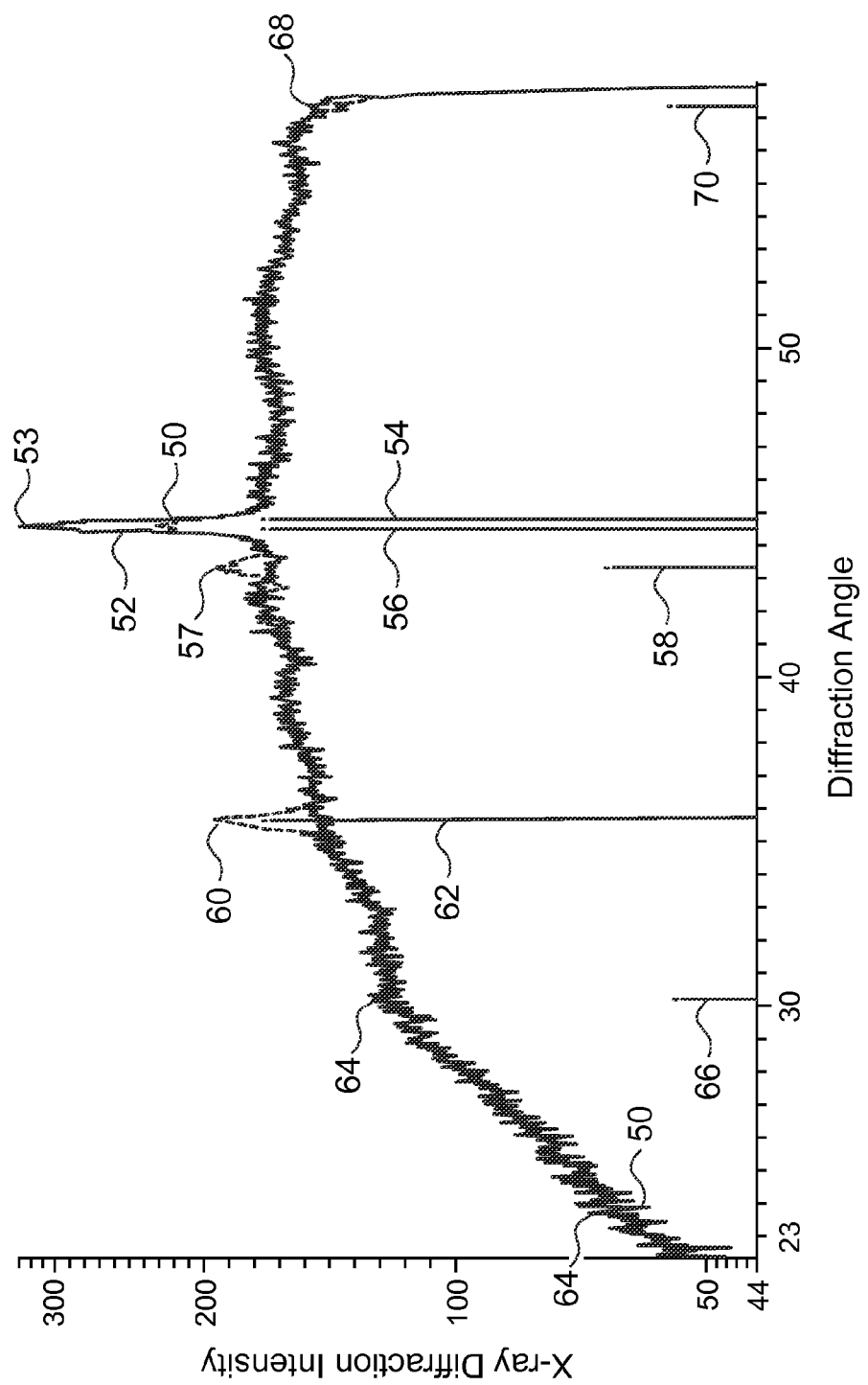
FIG. 2 is a X-ray diffraction plot of $Li_xNi_{1-x}O$ peaks present in the lithium nickel tungsten oxide nanocomposite material.

A LNWO layer about 300 nm thick was grown from a target material comprised of lithium oxide, nickel oxide, and tungsten oxide with a ratio of Li:Ni:W=1.5:1:0.25. The LNWO was deposited on a stainless steel substrate by RF sputtering in an atmosphere of half $O_2$ and half Ar. FIG. 2 is an X-ray diffraction intensity versus diffraction angle plot of the LNWO nanocomposite material of this example after annealing (trace 52) superimposed over an X-ray diffraction intensity versus diffraction angle plot of the material as-grown before annealing (trace 50). The largest peak 53 (designated by the iron index 54 at 44.8° and chromium index 56 at 44.5°) corresponds to the stainless steel substrate. The small peak 57 (designated by the index 58 at 43.3°), which corresponds to $Li_2NiFe_2O_4$, starts to appear at about 400° C. and is strongly evident by 615° C. The larger peak 60 (designated by the index 62 at 35.7°), which corresponds to $NiFe_2O_4$, appears at about 600° C. The much smaller peaks 64 (indicated by index 66 at) 30.3° and 68 (indicated by index 70 at 57.3°) also correspond to lithium iron nickel oxide and nickel iron oxide, respectively. Since only iron-bearing compounds show up during temperature rise of the anneal, it is apparent that the nanocrystalline NiO and interstitial lithium tungsten oxides are relatively stable, and the only limiting factor is reactivity of the substrate. If the NiO nanoparticles had increased in size, or if any secondary phases had started to form, such as the $NiWO_4$ that is present in films grown from targets containing only nickel and tungsten, then such increased NiO nanoparticle size or secondary phase would have been evident in the diffraction pattern.

Figure 3:
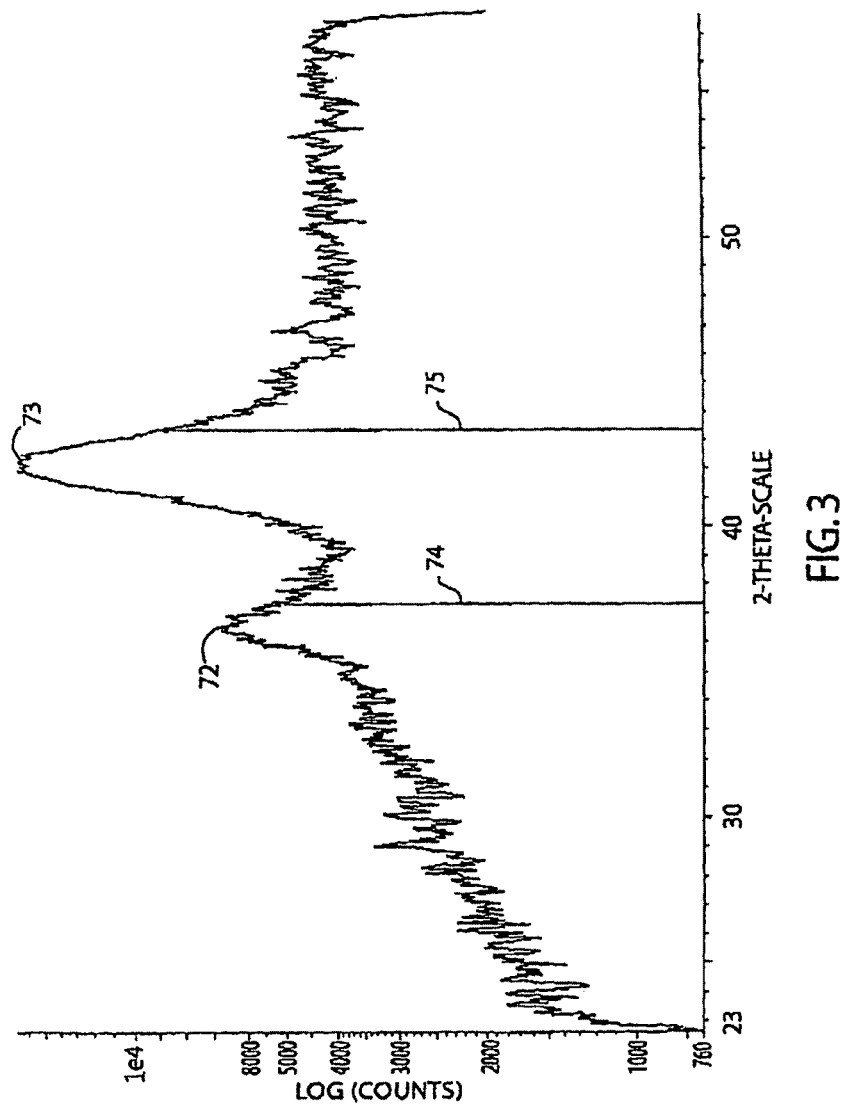
FIG. 3 is a X-ray diffraction plot of lithium nickel tungsten oxide nanocomposite material before and after annealing.

The results of a later, more involved diffraction experiment are shown in FIG. 3. In this case, a LNWO film with a ratio of Li:Ni:W=1.2:1:0.1 was grown on a glass substrate. In general, it is somewhat difficult to get strong diffraction data from these nanocomposite films, as was seen in the previous example. In this case, careful choice of substrate, exposure time, and data analysis yielded the pattern in FIG. 3. The peaks 72, 73 correspond to the structure of NiO, but they are shifted relative to the normal positions for NiO (indicated by indices 74, 75). This shift in the peak 72, 73 positions toward smaller angle means that the nanocrystals have NiO structure, but there is a large ion that is substituted for some of the Ni ions. In this case, that large ion is Li+. This result proves that the NiO particles are deposited in a partially lithiated state, i.e., $Li_xNi_{1-x}O$ as described above.

Figure 4:
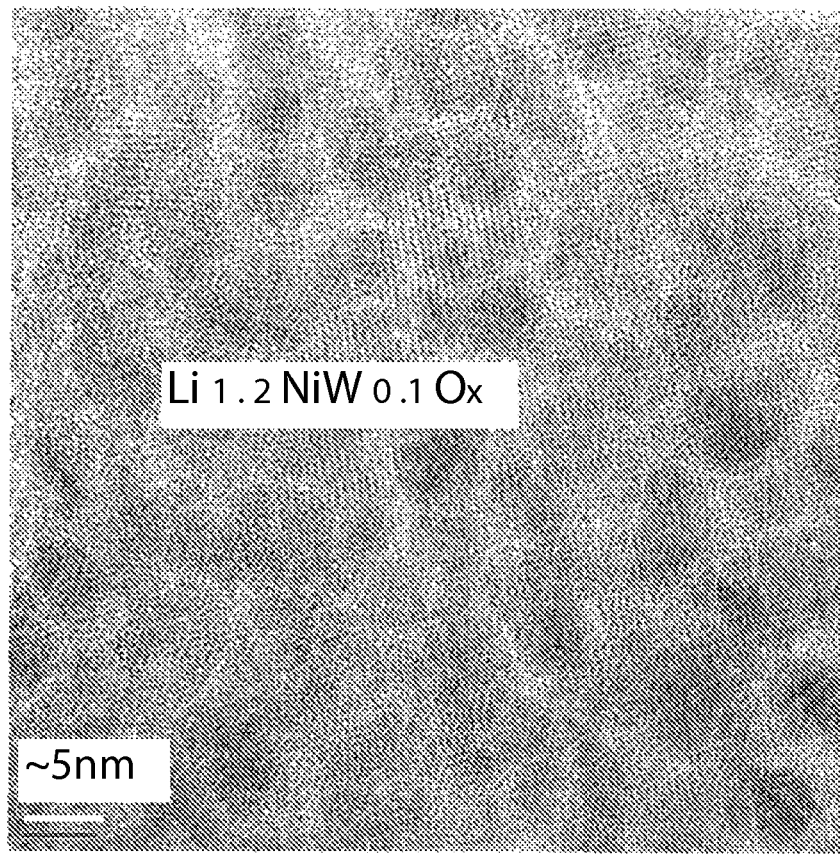
FIG. 4 is a transmission electron microscope image of the lithium nickel tungsten oxide nanocomposite material deposited on a transparent conducting tin oxide.

As shown by the transmission electron microscope (TEM) image of another LNWO sample in FIG. 4, the nanostructures and nanocrystals are less than one micrometer in size. For that LNWO sample, a 250 nm thick film of LNWO was grown on a glass substrate, which was pre-coated with fluorine-doped tin oxide. The $Li_xNi_{1-x}O$ grains are clearly visible in the picture, as is the lattice structure in the grains. Using the microscope electron beam, it is possible to get electron diffraction patterns from individual grains. For this film, the patterns confirm the results from the X-ray diffraction experiment described above.

Figure 5:
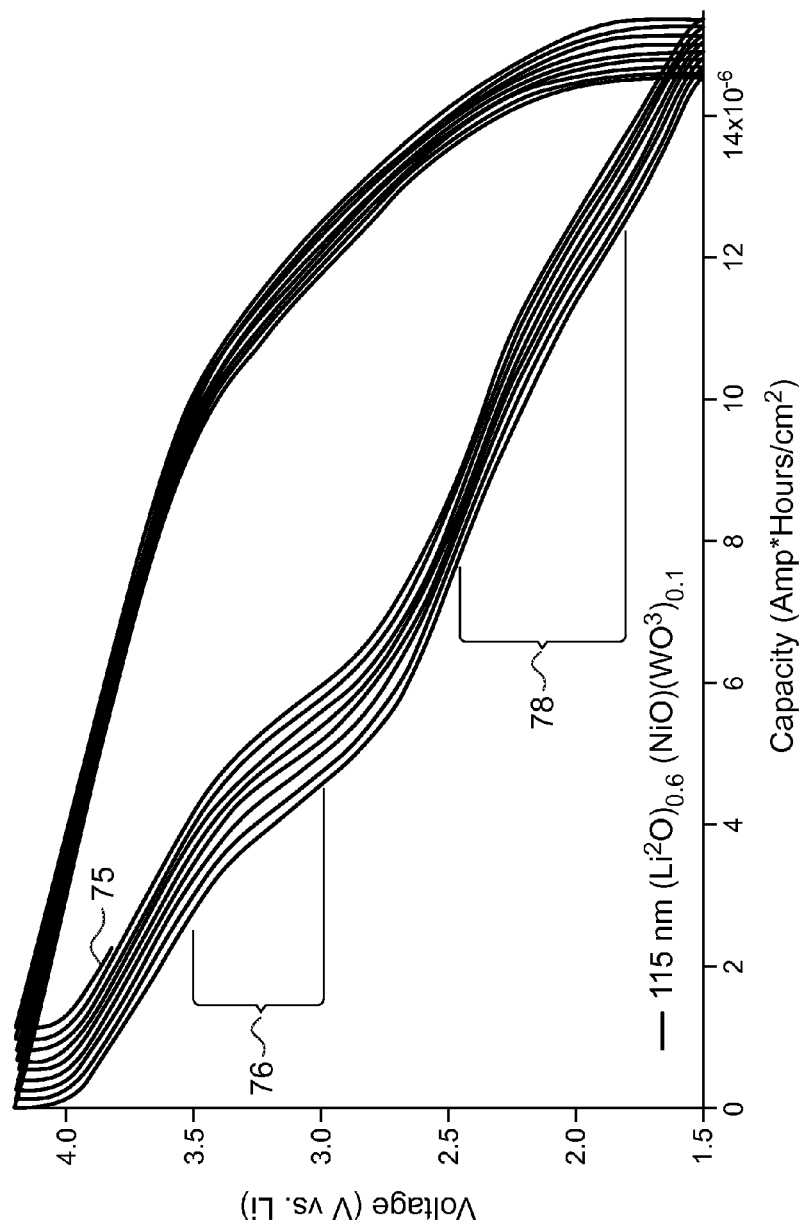
FIG. 5 is a graph of voltage versus capacity during charge-discharge cycles for lithium nickel tungsten oxide nanocomposite material.

The trace 75 in FIG. 5 illustrates the voltage versus capacity response of a 115 nm thick LNWO film, which was sputtered from a target comprised of $(Li_2O)_{0.6}(NiO)_{1.0}(WO_3)_{0.1}$, when it was cycled in a lithium cell through repeated bleached to dark and dark to bleached states. The slight perturbations 76, 78 in the lithium insertion phase of the cycle correspond to the percolation into $Li_xNi_{1-x}O$ crystallites. In this way, the nanocrystalline nature of the film is also evident. A broad, flat voltage vs. charge trace would be characteristic of more fully crystalline film, whereas a uniform, straight decrease would be characteristic of an amorphous film.

Figure 6:
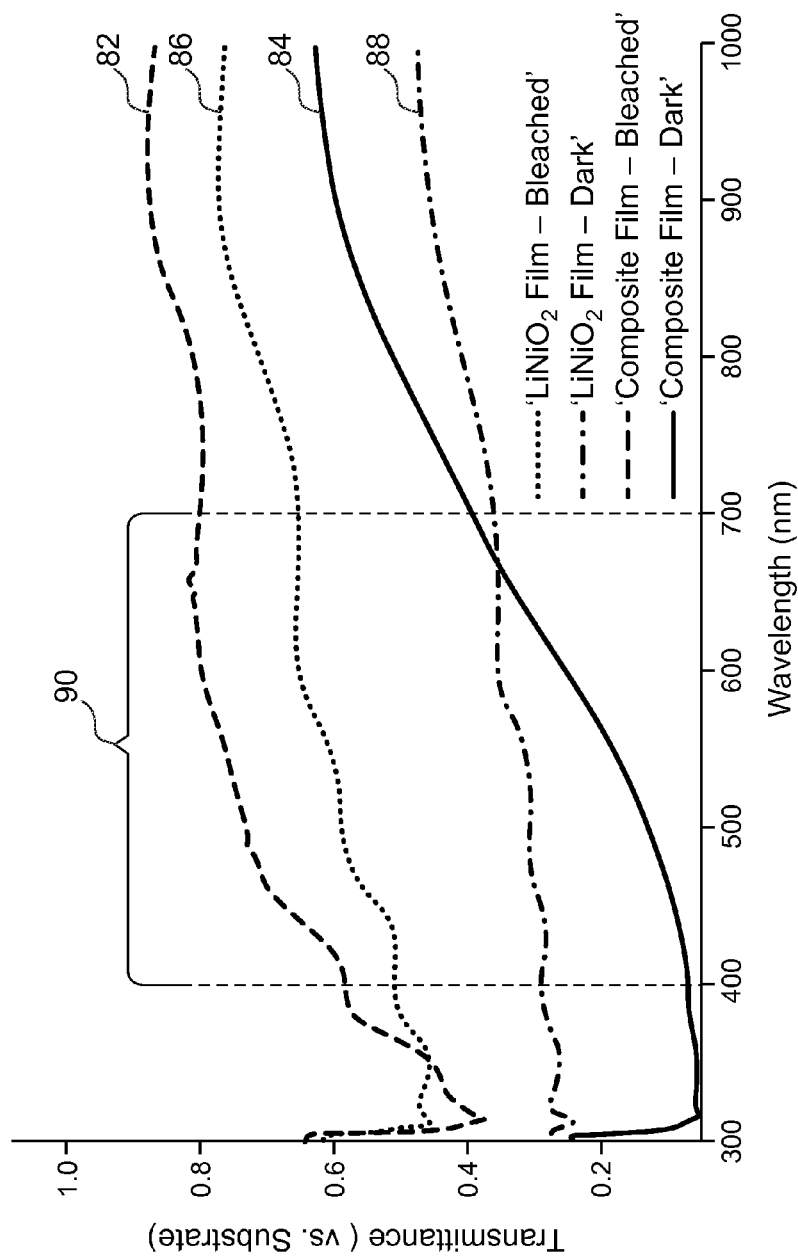
FIG. 6 is a plot of transmittance versus wavelength for lithium nickel tungsten oxide nanocomposite material in bleached and dark states as compared to that for lithium nickel oxide in bleached and dark phases.

The results described above clearly show that the LNWO films are a nanostructured composite of $Li_xNi_{1-x}O$ and lithium tungsten oxide compounds. As explained above, the very small lithiated NiO crystallite nanostructures 40 in combination with the lithium ion superionic conductor matrix 42 result in unexpectedly large enhancements in electrochromic activity of the lithium nickel tungsten oxide nanocomposite material over, for example, NiO alone and even over lithium nickel oxide ($LiNiO_2$). For example, the graph in FIG. 6 compares the transmittance versus wavelength of a sample LNWO nanocomposite material thin film 110 nm thick (ratio Li:Ni:W=1.2:1:0.1) when bleached (trace 82) and dark (trace 84) with a $LiNiO_2$ thin film, which is also approximately 70 nm thick, when bleached (trace 86) and dark (trace 88). As shown in FIG. 6, the transmittance difference between the bleached 82 and dark 84 for the LNWO nanocomposite material is much larger than for the $LiNiO_2$ in the visible wavelength range of about 400 to 700 nm (e.g., about twice as large in the middle of the visible range). Thus, the largest electrochromic change in the LNWO, as shown in FIG. 6, happens to be at about the peak of the photopic eye response of humans. It is interesting to note that even though the LNWO film is thicker than the $LiNiO_2$ film, the LNWO film is more transparent in the bleached state.

Figure 7:
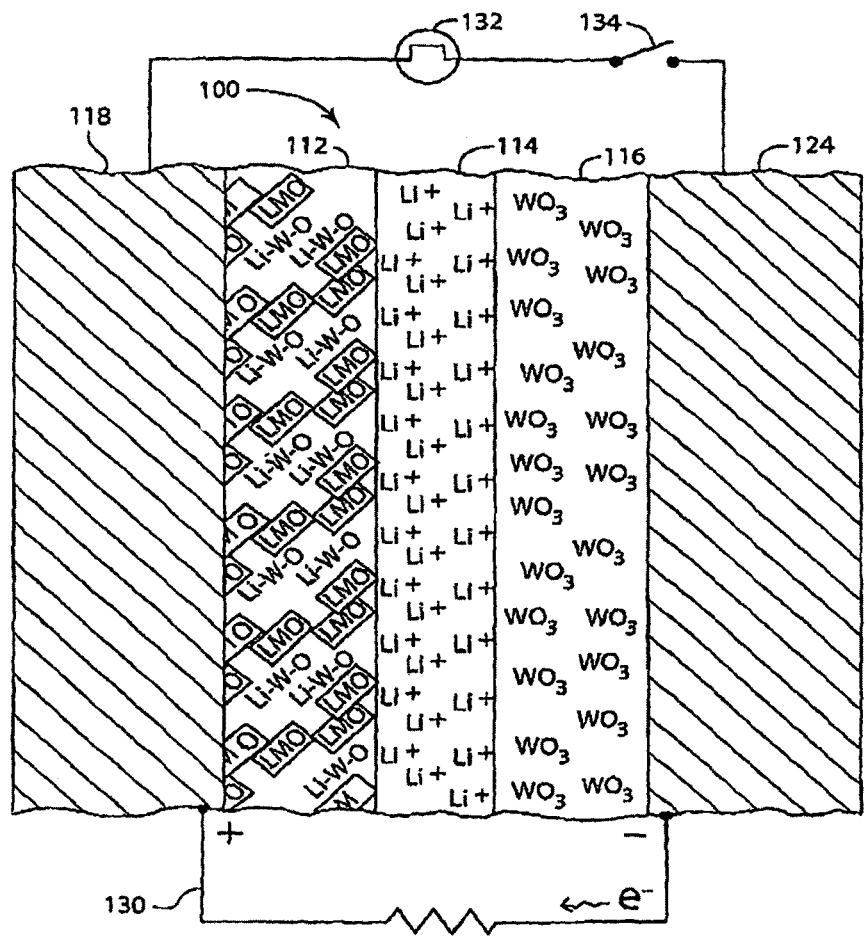
FIG. 7 is a diagrammatic view in section of a lithium ion battery cell that includes a positive electrode comprised of lithium nickel tungsten oxide nanocomposite material.

As also mentioned above, the charge capacity of the lithium nickel tungsten oxide nanocomposite material is also very high, so it can also function as the positive electrode (cathode) 112 of a lithium ion battery cell 100, as illustrated diagrammatically in FIG. 7. Since none of the components of a battery have to be transparent, the lithium nickel tungsten oxide nanocomposite material (LNWO) of the positive electrode 112 can be deposited directly on a metal or other conductive substrate or layer 118, if desired. The negative electrode (anode) 116 does not have to be electrochromic, so any common negative electrode material used for lithium ion battery cells, such as those mentioned above, can be used. The example cell in FIG. 7 is illustrated for example with lithium metal (Li) for the negative electrode 116, and it can be deposited on any suitable conductive metal or other conductive substrate or contact 124. Likewise, the electrolyte 114 can be any of the materials mentioned above or others that provide lithium ions (Li$^+$) for intercalation with the positive and negative electrode materials.

In operation, during discharge, the Li metal is inherently unstable, thus at a higher energy state than oxidized lithium ions (Li$^+$). Therefore, the lithium metal oxidizes and gives up electrons, which flow through the external circuit 130, including the load 131, to the positive electrode 112, which comprises the LNWO as described above. The reaction at the negative electrode 116 is:

$$n\text{Li} \rightarrow n\text{Li}^+ + ne^-, \quad (5)$$

where n can be any number, and it is reversible upon application of a higher voltage source 132 in the external circuit to drive reducing electrons back into the Li negative electrode 116 to thereby reduce Li$^+$ to the higher energy state of lithium metal. Such recharging can be implemented, for example, by closing a switch 134.

In the positive electrode 112 during discharge of the battery cell 100, the LNWO functions substantially as described above for the electrochromic cell 10 and shown by equation (3). In the charging mode, the LNWO functions as shown by equation (4). We have shown LNWO to have charge capacity as high as 250 µAh/gram, as shown in the following Example VII, which compares very favorably to the approximately 120 µAh/gram capacity of typical LiCoO$_2$ positive electrodes, which are current state-of-the-art in lithium ion batteries.

EXAMPLE VII

The voltage versus capacity plot of FIG. 5 is an excellent example of the capacity of these films. The Li:Ni:W ratio was 1.2:1:0.1, and the film thickness was 115 nm. As can be seen in FIG. 5, the total capacity for the 1 cm$^2$ film was 1.45 µAh/cm$^2$. Given that the film density was 5.0 g/cm$^3$, this figure means that the capacity on full discharge was approximately 25 µAh/gram. Depending on specific necessary voltages and cycling needs of a given battery application, the actual charge capacity might be higher or lower than this number.

While a number of example aspects, implementations, and embodiments have been discussed above, those of skill in the art will recognize certain modifications, permutations, additions, variations, and subcombinations thereof, for example, but not for limitation, substituting Mn, Co, Fe, or V for the Ni in the lithium nickel tungsten oxide nanocomposite material. It is therefore intended that the following appended claims hereafter introduced are interpreted to include all such modifications, permutations, additions, and subcombinations as are within their true spirit and scope. The words "comprise," "comprises," "comprising," "comprised," "compose," "composing," "composed," "have," "having," "include," "including," and "includes" when used in this specification and in the following claims are intended to specify the presence of stated features or steps, but they do not preclude the presence or addition of one or more other features, steps, or groups thereof.

We claim:

1. An electrochromic cell, comprising:
   a negative electrode comprising a cathodic electrochromic material that darkens upon electrochemical reduction;
   a positive electrode comprising a nanocomposite material that includes two constituent components, one of the constituent components being an amorphous, solid state matrix of lithium-based superionic conductor comprising lithium-tungsten-oxide (Li—W—O), wherein the lithium-tungsten-oxide (Li—W—O) consists of at least one of stoichiometric Li$_2$WO$_4$, stoichiometric Li$_2$W$_4$O$_{13}$ or both, and the second of which constituent components includes anodic nanoparticles of polycrystalline, lithiated, metal oxide dispersed in and surrounded by the amorphous, solid state matrix of lithium-based superionic conductor, where the metal in the anodic nanoparticles of polycrystalline, lithiated, metal oxide includes at least one of Ni, Mn, Co, Fe, and V; and
   a lithium ion electrolyte sandwiched between the negative electrode and the positive electrode.

2. The electrochromic cell of claim 1, wherein the second of the constituent components of the positive electrode also includes anodic nanoparticles of non-lithiated metal oxide dispersed in and surrounded by the amorphous, solid state matrix of lithium-based superionic conductor, where the metal in the anodic nanoparticles of polycrystalline, non-lithiated, metal oxide includes at least one of Ni, Mn, Co, Fe, and V.

3. The electrochromic cell of claim 1, wherein the lithium-tungsten-oxide includes a mixture consisting of stoichiometric Li$_2$WO$_4$ and stoichiometric Li$_2$W$_4$O$_{13}$.

4. The electrochromic cell of claim 1, wherein the lithium-based, amorphous, solid state superionic conductor also comprises Li$_2$O.

5. The electrochromic cell of claim 2, wherein the anodic nanoparticles of polycrystalline, lithiated, metal oxide are less than 100 nm in diameter.

6. The electrochromic cell of claim 2, wherein the anodic nanoparticles of polycrystalline, lithiated, metal oxide are less than 35 nm in diameter.

7. The electrochromic cell of claim 5, wherein the anodic nanoparticles of polycrystalline, lithiated, metal oxide include anodic nanoparticles of polycrystalline Li$_x$Ni1-xO where 0<x<0.5.

8. The electrochromic cell of claim 1, wherein an external circuit with an electric power source is connected between the negative and positive electrodes to drive electrons into the cathodic material and cause reduction of the cathodic material.

* * * * *